United States Patent
Leitermann et al.

(10) Patent No.: US 7,441,980 B2
(45) Date of Patent: Oct. 28, 2008

(54) DEVICE FOR JOINING TWO COMPONENTS WITH TOLERANCE COMPENSATION

(75) Inventors: Wulf Leitermann, Bad Wimpfen (DE); Klaus Friedrich Grubert, Bückeburg (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 11/545,431

(22) Filed: Oct. 10, 2006

(65) Prior Publication Data

US 2007/0081854 A1 Apr. 12, 2007

(30) Foreign Application Priority Data

Oct. 10, 2005 (DE) .................. 20 2005 015 860 U

(51) Int. Cl.
*F16B 7/10* (2006.01)

(52) U.S. Cl. .................. 403/149; 403/166; 403/229; 403/327; 411/438; 411/544; 267/157; 267/180

(58) Field of Classification Search .......... 403/11, 403/109.3, 145–149, 166, 229, 304, 327, 403/359.4; 411/546, 544, 538; 267/155, 267/157, 166, 169, 170, 174, 178, 180
See application file for complete search history.

(56) References Cited

U.S. PATENT DOCUMENTS

| | | | | | |
|---|---|---|---|---|---|
| 2,893,766 | A | * | 7/1959 | Meyer | 403/396 |
| 3,455,559 | A | * | 7/1969 | Wilson | 360/261.2 |
| 5,096,019 | A | * | 3/1992 | Kelsay | 182/155 |
| 5,254,041 | A | * | 10/1993 | Duclo | 474/14 |
| 5,338,139 | A | * | 8/1994 | Swanstrom | 411/353 |
| 5,402,316 | A | * | 3/1995 | Volz et al. | 361/785 |
| 5,730,540 | A | * | 3/1998 | Duran et al. | 403/21 |
| 5,865,582 | A | * | 2/1999 | Ellis et al. | 411/353 |
| 6,102,357 | A | * | 8/2000 | Papadatos | 248/519 |
| 6,468,012 | B2 | * | 10/2002 | Ellis et al. | 411/353 |
| 6,494,659 | B1 | * | 12/2002 | Lutkus et al. | 411/438 |
| 6,802,656 | B2 | * | 10/2004 | Arbuckle | 396/427 |
| 6,955,513 | B2 | * | 10/2005 | Niku | 411/382 |
| 2002/0154966 | A1 | | 10/2002 | Stone et al. | |

FOREIGN PATENT DOCUMENTS

| | | |
|---|---|---|
| DE | 30 37 606 C2 | 11/1982 |
| DE | 35 24 309 C2 | 8/1988 |
| DE | 42 24 575 C2 | 7/2000 |

(Continued)

*Primary Examiner*—Daniel P. Stodola
*Assistant Examiner*—Nahid Amiri
(74) *Attorney, Agent, or Firm*—Seyfarth Shaw LLP

(57) ABSTRACT

A device for joining a first component A and a second component B while leaving a joining gap SP includes a bolt 4 and a compensating coil 2 for compensating tolerances of the joining gap. The compensating coil is adapted to be fixed to the bolt 4 by frictional engagement means and/or releasable positive engagement means. The dimensions of the compensating coil are adapted to a helical rim hole portion 6 of the first component A such that actuation of the bolt 4 causes the compensating coil to rotate through the helical rim hole portion until it fills the joining gap for the purpose of tolerance compensation, and the frictional engagement means and/or releasable positive engagement means is overcome by further actuation of the bolt 4 so that the bolt can be screwed into a threaded hole of the second component B to join the two components.

14 Claims, 2 Drawing Sheets

FOREIGN PATENT DOCUMENTS

| | | |
|---|---|---|
| DE | 101 51 383 A1 | 4/2003 |
| DE | 203 14 003 U1 | 12/2003 |
| EP | 0 176 663 B1 | 4/1986 |
| EP | 0 373 049 A1 | 6/1990 |
| EP | 0 957 272 B1 | 11/1999 |
| FR | 2 863 019 | 6/2005 |

* cited by examiner

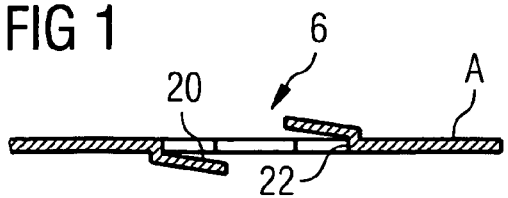
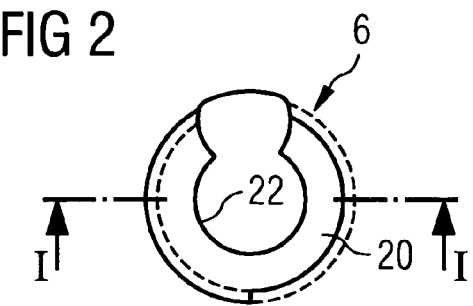
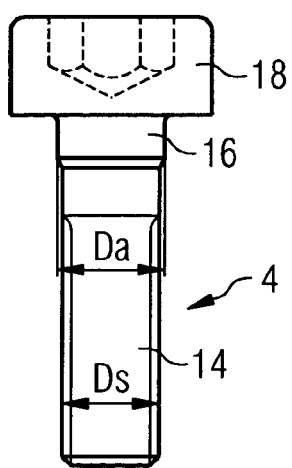
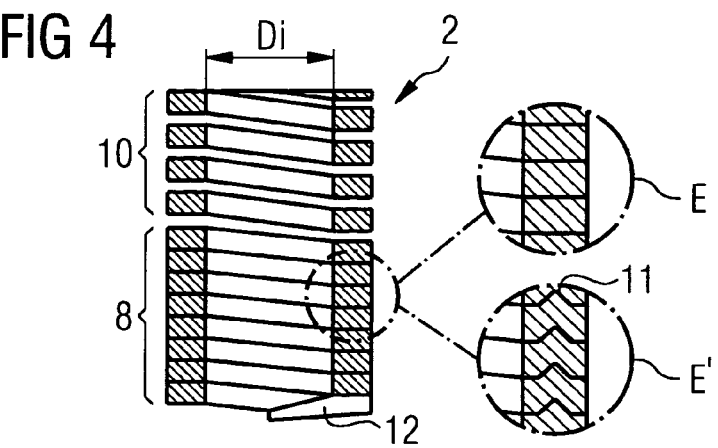

US 7,441,980 B2

DEVICE FOR JOINING TWO COMPONENTS WITH TOLERANCE COMPENSATION

BACKGROUND OF THE INVENTION

The present invention relates to a device for joining a first and a second component while leaving a joining gap and comprising automatic compensation of joining gap tolerances.

A great variety of such devices comprising automatic tolerance compensation are known, see for example EP 0 176 663 B1, DE 42 24 575 C2, DE 101 51 383 A1, DE 201 19 0012 U and DE 203 14 003 U. They enable a screw connection between two components and at the same time provide for automatically compensating joining gaps between the customarily pre-assembled two components due to manufacturing and/or mounting tolerances. Although numerous such devices have proven themselves in practice, there is room for improvement at least with respect to one of the following properties: manufacturing costs, number of individual parts, simplicity of the structure, required space, operational reliability.

SUMMARY OF THE INVENTION

The present invention addresses the object of providing a device for screwing two components together while leaving a joining gap and comprising automatic compensation of joining gap tolerances which has fewer parts, a simple structural design, requires less space and has high operational reliability.

The device configured according to the invention consists of a bolt and a compensating coil as well as a helical rim hole portion on one of the components. According to the invention, the compensating coil is fixable to the bolt by means of frictional engagement and/or releasable form fit and its dimensions are coordinated to the helical rim hole portion such that upon actuation, the bolt is rotatable through the rim hole portion until it fills the joining gap for the purpose of tolerance compensation. The frictional engagement and/or form fit between the bolt and the compensating coil is then overcome by further actuation of the bolt so that the bolt can be screwed into a threaded hole of the second component to bolt the two components together.

Therefore, apart from the specially-configured components to be bolted, the device configured according to the invention only consists of a bolt and a compensating coil. It is therefore characterized by a small number of individual parts as well as by a simple structural design, which is reflected in the accordingly low manufacturing and assembly costs. The space requirement is also relatively small since the compensating coil can have a smaller outer diameter than the head of the bolt. All in all, the device configured according to the invention affords high operational reliability as well as long operational life.

Thus, the compensating coil for the device configured according to the invention appropriately has a stacked-wound pitch portion to fill the joining gap as well as an interspaced-wound pitch portion which is compressed when the bolt is screwed into the threaded hole of the second component.

The bolt for the device configured according to the invention thus appropriately has a threaded portion and a non-threaded engaging portion, the diameter of the latter being larger than the outer diameter of the threaded portion and larger than the inner diameter of the compensating coil so as to generate the necessary frictional engagement between the bolt and the compensating coil.

Further advantageous developments and embodiments of the invention are defined in the subclaims.

BRIEF DESCRIPTION OF THE DRAWINGS

The following will make reference to the figures in describing an exemplary embodiment of the invention in greater detail. Shown are:

FIG. 1 is a section through a component A in the direction of arrow I-I in FIG. 2;

FIG. 2 is a plan view of component A from FIG. 1;

FIG. 3 is a side view of a bolt;

FIG. 4 is a longitudinal section through a compensating coil with details E and E';

DESCRIPTION OF THE PREFERRED EMBODIMENTS

Figure 5:
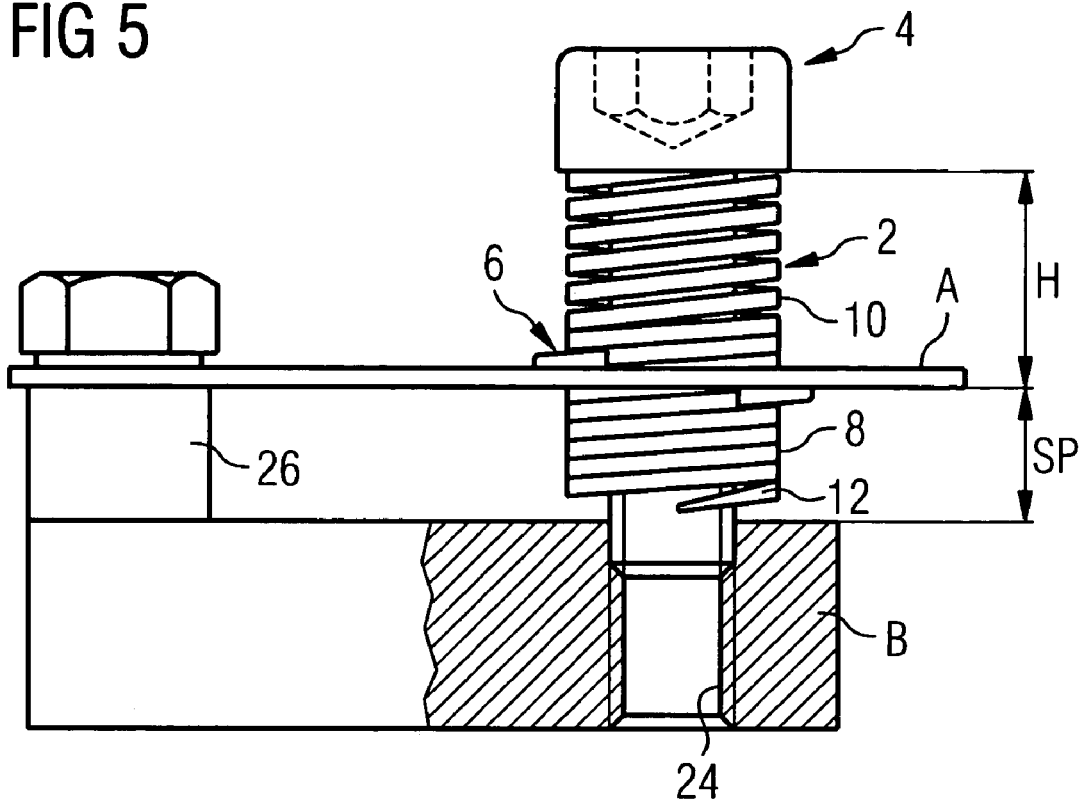
FIG. 5 is a partial sectional side view of a device configured according to the invention for bolting two components during its assembly.

The device shown in the figures for screwing a component A and a component B together while leaving a joining gap SP (see FIGS. 5 and 6) basically consists of a compensating coil 2, a bolt 4, and a rim hole portion 6 of component A. The joining gap SP is variable due to manufacturing and/or mounting-related tolerances. The device to be described provides for an automatic compensation of these tolerances.

The compensating coil shown in FIG. 4 is configured as a helical spring having a large number of coils. In the exemplary embodiment as shown, the coils of compensating coil 2 have a uniform inner diameter Di and a uniform outer diameter such that the compensating coil 2 as a whole is in the form of a cylinder having a cylindrical hole.

As can be seen in FIG. 4 and the associated detail E, the coils have a flattened cross-section so as to realize a planar abutting of the coils on either side. In the actual exemplary embodiment, the coils have a rectangular cross-section (detail E) so as to form a type of washer stack. In order to prevent lateral slippage of the coils in the tightened state, the cross-section can also have a contour 11 (detail E') so that the coils are prevented from displacing laterally by form-fit locking. In the exemplary embodiment as shown, contour 11 exhibits a central, ridge-like elevation/depression of the coils, as can be seen in detail E'.

The compensating coil 2 consists of a stacked-wound pitch portion 8 and an interspaced-wound pitch portion 10, the purpose of which will be described in greater detail below. As can be seen from FIG. 4, the stacked-wound pitch portion 8 exhibits an end 12 which is raised somewhat relative to the other coils, the purpose of which will likewise be described in greater detail.

The bolt 4 consists of a threaded portion 14, a non-threaded engaging portion 16 as well as a bolt head 18. The outer diameter Ds of the threaded portion 14 is smaller than the inner diameter Di of the compensating coil 2. The outer diameter Da of the engaging portion 16 is larger than the inner diameter Di of the compensating coil such that the bolt 4 is connectable to the compensating coil 2 in the engaging portion Da by means of frictional engagement. The frictional engagement between the compensating coil 2 and the bolt 4 could, however, also be produced in a different way, for example by the compensating coil being tapered upward. A releasable form fit could also substitute for the frictional engagement or be combined with same. For example, a ratchet-like snap-on connector, a gap just under the head of the bolt or similar means could be provided. Having the bolt drive the compensating coil would then also be ensured if a frictional engagement was insufficient to transmit the necessary torque, due e.g. to the presence of lubricants.

Component A is configured as a relatively thin-walled plate while component B may be configured with thicker walls. As can be seen in FIGS. 1 and 2, the rim hole portion 6 consists of a helically-extending member 20 which is formed from out of the component A plane and extends helically in a single coil around a circular hole 22. In the exemplary embodiment as shown, the rim hole portion 6 is incorporated directly into component A. This can be realized, for example, by first punching hole 22 into component A, whereupon member 20 is formed with a shaping punch. Another possibility consists of configuring the rim hole portion in a separate component (not shown) which is then solidly connected to component A.

Figure 6:
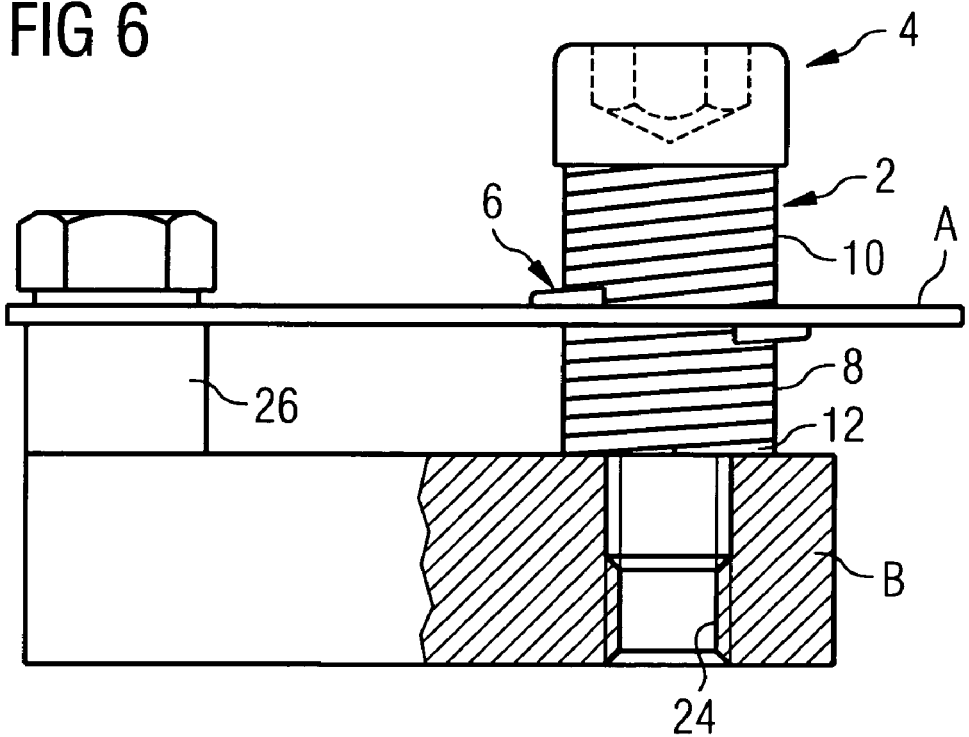
FIG. 6 is a view of the device corresponding to FIG. 5 in its fully assembled state.

The rim hole portion 6 shown in FIG. 1 is configured such that the whole of member 20 is positioned to one side relative to the plane of component A. FIGS. 5 and 6 show a modified embodiment in which the rim hole portion 6 is formed on both sides from out of the component A plane.

The assembly and operation of the described device is as follows:

A conventional screw connection 26 is seen on the left-hand side of FIGS. 5 and 6, by means of which component A is pre-mounted on component B in the exemplary embodiment as shown.

In order to assemble the device (FIGS. 5, 6), the compensating coil 2 is mounted onto the bolt 4. Because of the oversized diameter Da to the engaging portion 16 relative to the inner diameter Di of the compensating coil 2, the compensating coil 2 is then frictionally fixed to the bolt 4. The oversizing between Da and Di is to be defined so as to provide sufficient frictional engagement (positive locking) for the bolt 4 to drive the compensating coil 2.

The bolt 4 with the frictionally-fixed coil 2 is then screwed into the engaging portion 6 of component A. For this purpose, aided by the raised end 12, the compensating coil 2 "threads" into the rim hole portion 6 such that the helical member 20 positions between the coils of pitch portion 8 of the compensating coil 2. The compensating coil 2 can then be smoothly turned through the rim hole portion 6 by the rotating of bolt 4, wherein in each case one coil of the compensating coil 2 abuts the underside of member 2 and one adjacent coil the upper side of member 2.

The above thus ensures a secure pre-assembly of the bolt 4 and the compensating coil 2 on component A. Component A, compensating coil 2 and bolt 4 can therefore be handled as one unit before bolting component A to component B.

The bolt 4 is then actuated in order to screw components A and B together, which then engages the compensating coil 2 via frictional engagement and/or form fit and rotates it therewith through the rim hole portion 6 until the end 12 of the compensating spring 2 reaches component B. When the distant end 12 is pressed into abutment with the abutting coil of compensating spring 2, the stacked-wound pitch portion 8 of the compensating coil 2 fills joining gap SP completely. Hence, tolerances in the joining gap SP are automatically compensated.

If the bolt 4 is rotated further to overcome the frictional engagement and/or form fit between the compensating coil 2 and the bolt 4, the interspaced-wound pitch portion 10 of the compensating coil 2 is compressed by the head 18 of the bolt 4 until the coils of the interspaced-wound pitch portion 10 of the compensating coil 2 abut one another. During this described process, the threaded portion 14 of the bolt 4 is screwed into a flushly-arranged threaded hole 24 of component B. Tightening the bolt 4 achieves a tight engagement of components A and B. Because of the automatic tolerance compensation, the joining gap SP is thereby maintained without distortion and/or deformation of component A or B.

The axial length of the interspaced-wound pitch portion 10 is selected to be large relative to the bolt nominal diameter, e.g. so that it is of a magnitude of or greater than the axial length of the pitch portion 8. This then results in a large clamping length (H+SP dimension) relative to the bolt nominal diameter, which leads to a large absolute expansion of the bolt 4. This is of particular advantage in terms of screw connection reliability against loosening due to vibratory load.

A conventional screw connection 26 is seen on the left-hand side of FIGS. 5 and 6, by means of which component A is pre-mounted on component B in the exemplary embodiment as shown. Should this screw connection 26 be subject to tolerances, components A and B are brought into the desired structural arrangement with concurrent tolerance compensation by employing the object according to the invention.

We claim:

1. A joining device comprising:
a first component having a thru-hole defined by a helical rim;
a second component having a threaded hole, said first and second components being arranged so that said thru-hole and said threaded hole are aligned, and being spaced from each other so as to leave a joining gap therebetween which may vary due to tolerances;
a bolt for joining said first and second components;
a compensating coil, said compensating coil and said helical rim of said thru-hole being of conforming dimensions to enable the compensating coil to be threadingly rotated through said helical rim; and
engagement means releasably fixing the compensating coil on the bolt in order to transfer torque therebetween and releasing the compensating coil from the bolt when said torque exceeds a predetermined amount, such that rotatably driving said bolt causes said bolt and said compensating coil fixed thereupon to pass through said thru-hole of said first component until said compensating coil fills said joining gap, and further rotatably driving said bolt releases said engagement means and tightens said bolt by threaded engagement with said threaded hole of said second component for joining said first and second components.

2. The device according to claim 1, characterized in that the compensating coil comprises a stacked-wound pitch portion to fill the joining gap.

3. The device according to claim 2, characterized in that the axial length of the stacked-wound pitch portion of the compensating coil is larger than the maximum depth of the joining gap.

4. The device according to claim 2, characterized in that the stacked-wound pitch portion of the coil has an end raised with respect to an adjacent part thereof in order to facilitate threading of the compensating coil into the helical rim of the first component.

5. The device according to claim 1, characterized in that the compensating coil comprises an interspaced-wound pitch portion which is compressed when the bolt is screwed into the threaded hole of the second component.

6. The device according to claim 5, characterized in that the axial length of the interspaced-wound pitch portion of the compensating coil is large relative to the diameter of the bolt in order to allow a large length of the bolt.

7. The device according to claim 1, characterized in that the compensating coil has a flattened cross-section for the purpose of planar abutting of its coils on either side.

8. The device according to claim 1, characterized in that the cross-section of the compensating coil has a contour which prevents lateral slippage of the coils of the compensating coil in the tightened state.

9. The device according to claim 1, characterized in that the bolt has a non-threaded engaging portion connectable to the compensating coil by frictional engagement.

10. The device according to claim 1, characterized in that the bolt has a threaded portion, its outer diameter being smaller than the inner diameter of the compensating coil.

11. The device according to claim 1, characterized in that the helical rim of the thru-hole of the first component extends over a maximum of one single coil.

12. The device according to claim 1, characterized in that the pitch of the helical rim is essentially the same as the pitch of the compensating coil.

13. The device according to claim 1, characterized in that the helical rim is incorporated directly into the first component.

14. A joining device comprising:

a bolt for joining first and second components with a joining gap therebetween;

a compensating coil comprising, in an unloaded condition, a stack-wound pitch portion having a plurality of helical turns axially abutting each other, and an interspaced-wound pitch portion having a plurality of helical turns axially spaced each other; and engagement means releasably fixing the compensating coil on the bolt in order to transfer torque therebetween and releasing the compensating coil from the bolt when said torque exceeds a predetermined amount.

* * * * *